Jan. 1, 1963 R. T. CORNELIUS 3,071,153
VALVES
Filed July 17, 1959

INVENTOR
RICHARD T. CORNELIUS

Caswell & Lagaard
ATTORNEYS

United States Patent Office 3,071,153
Patented Jan. 1, 1963

3,071,153
VALVES
Richard T. Cornelius, Minneapolis, Minn., assignor, by mesne assignments, to Stewart-Warner Corporation, Chicago, Ill., a corporation of Virginia
Filed July 17, 1959, Ser. No. 827,808
3 Claims. (Cl. 137—516.29)

The herein disclosed invention relates to valves and particularly to the construction of the movable valve structure thereof engaging the valve seat and has for an object to provide a construction in which leakage is prevented with light pressure on the valve structure.

Another object of the invention resides in providing a valve structure having a valve head and a flexible sealing member backed by a metal backing member on said head and which prevents the same from blowing out past the valve seat.

A still further object of the invention resides in providing the valve body with a beveled valve seat and said head and backing member with a conical surface adapted to engage the valve seat and in constructing the sealing member with an annular corner projecting outwardly beyond the confines of the backing surface of the member when the valve is open and adapted to be compressed into the confines of the valve seat when the valve is closed.

Another object of the invention resides in constructing the sealing member in the form of a cylindrical disc attached to the end of the valve head and having a circular corner projecting outwardly beyond the surface of the backing member when the valve is open.

A still further object of the invention resides in providing the end of the valve head with a cylindrical socket adapted to receive the sealing member.

Other objects of the invention reside in the novel combination and arrangement of parts and in the details of construction hereinafter illustrated and/or described.

Figure 1:
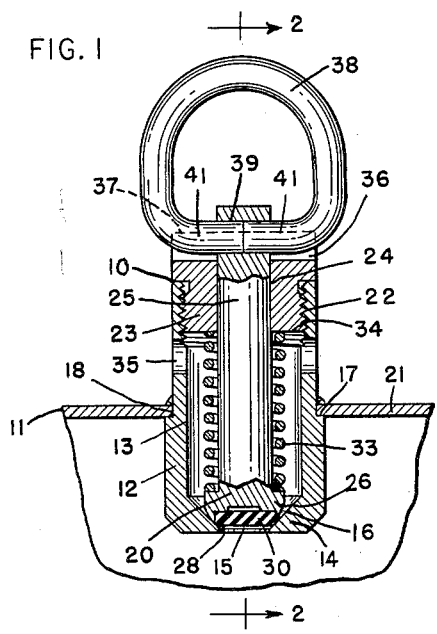
FIG. 1 is a longitudinal elevational sectional view of a valve illustrating the invention with the valve structure in closed position.

For the purpose of illustrating the application of the invention, a valve 10 has been shown, which is a relief valve and which operates in the usual manner to relieve the pressure in a tank 11 in which the same is installed when the pressure rises above a certain amount. This valve comprises a tubular body 12 having a bore 13 therein and open at its outer end. This body is constructed with a flange 14 having an inlet passageway 15 therethrough and communicating with the bore 13. This passageway is encircled by a beveled valve seat 16 and is formed with a shoulder 17 intermediate the ends thereof. The body 12 is also formed with two outlet openings 35 disposed above the shoulder 17 and communicating with the bore 13 and the exterior. The valve body 12 is received in a hole 18 in a wall 21 of the tank 11 and is soldered or brazed thereto, with the shoulder 17 butting against the inner surface of said wall.

Figure 2:
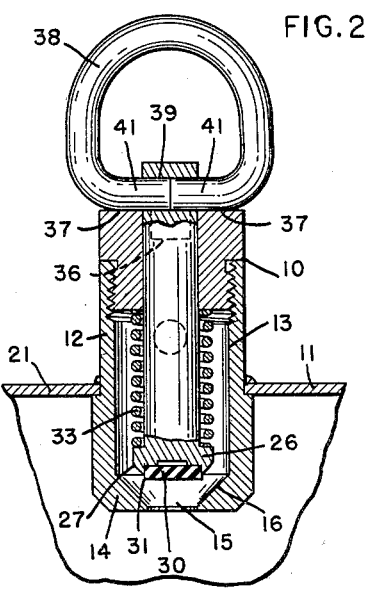
FIG. 2 is a view similar to FIG. 1 taken on line 2—2 of FIG. 1 with the valve structure rotated through an angle of 90 degrees an the valve open.

The outer end of the housing 12 is constructed with threads 22 and into which is screwed a threaded cap 23. This cap has a bore 24 and in which is slidably mounted the stem 25 of a movable valve structure 20. The valve structure 20 further includes a head 26. The head 26 is formed at its end with a conical surface 27 forming a more acute angle than the bevel of the valve seat 16 and which is adapted to engage said valve seat. Also formed in the end of the head 26 is a cylindrical socket 28 which has a radial surface 43 and a cylindrical surface 44. This latter surface intersects the surface 27 to form on the head 26 an annular rim 42 encircling the socket 28. Received in the socket 28 is a flexible sealing member 30. This sealing member is constructed of rubber or some other similar material and as shown in FIG. 2 is in the shape of a cylindrical disc and has an annular corner 31 extending about the same and projecting outwardly beyond the surface 27 of the head 26 and lying in juxtaposition relative to the rim 42. The sealing member 30 is cemented in position within the socket 28 and is thus permanently attached to the valve head.

The valve head 26 is of greater diameter than the valve stem 25 to form a shoulder 32 therebetween. A compression coil spring 33 is seated at one end against the shoulder 32 and at its other end against the underside 34 of the cap 23. This spring urges the valve structure 20 into closing position.

Extending across the upper portion of the cap 23 is a transverse slot 36 providing lands 37 on opposite sides thereof. A looped handle 38 extends through a transverse hole 39 in the outer end of the stem 25 and has two coaxial shanks 41 extending through the hole 39. These shanks are adapted to be received in the slot 36 when the valve is in closing position, as shown in FIG. 1, or to ride upon the lands 37 when the valve is open as shown in FIG. 2 and the valve structure rotated 90 degrees.

Figure 3:
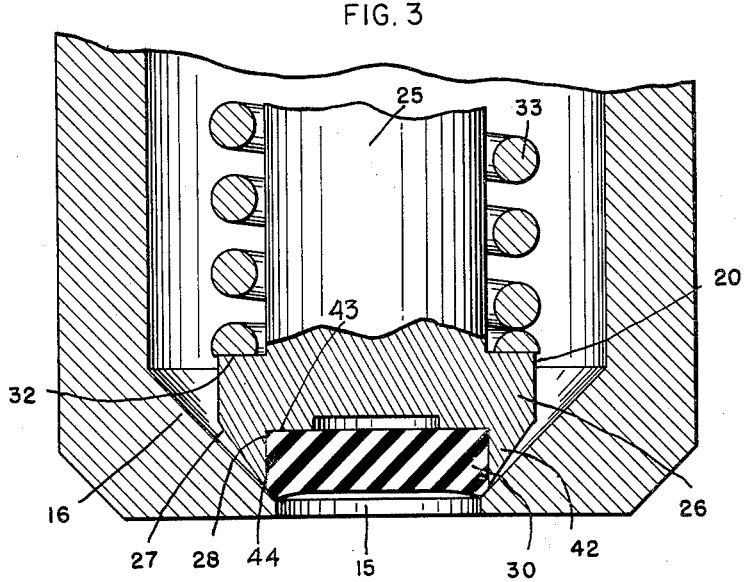
FIG. 3 is a view similar to FIG. 1 of a portion of the structure shown therein and drawn to an enlarged scale.

The method of operation of the invention is as follows: When the valve is open, as shown in FIG. 2, the annular corner 31 of the sealing member 30 projects outwardly beyond the annular tip 42 of the valve head 26. When the valve is released by rotating the handle 38 until the shanks 41 drop into the slot 36, the corner 31 first engages the surface of the valve seat 16 and becomes compressed until the same occupies the position shown in FIG. 3 and in which the portions of the sealing member 30 are disposed within the confines of the said valve seat. This causes inward compression of the flexible sealing member causing the same to assume a cup-shaped form upon the inner surface with the portion of the same engaging the valve seat 16 resiliently urged against said valve seat. Compression of the sealing member 30 is limited when the annular rim 42 of the valve head engages the valve seat 16. With the construction shown, the pressure exerted by the valve seat against the sealing member is radially inwardly. Any pressure within the tank hence will not tend to force the sealing member to blow by the head due to the fact that the annular rim 42 is in engagement with the valve seat. Light pressure need hence be only used on the sealing member to procure positive and tight closure of the valve, the annular rim 42 limiting compression of the same.

The advantages of the invention are manifest. Due to the direction in which the corner of the sealing member is stressed in the closing of the valve, the said sealing member quickly assumes its original position when the valve is opened and is at all times, when the valve is open, ready to contact the valve seat and effect an immediate and tight closure. The sealing member first engaging the valve seat with a sharp annular corner immediately effects a seal and which produces tight closure of the valve. With the valve head positively engaging the valve seat at the locality of issuance of the sealing member therefrom, blowing by of the sealing member is completely prevented. The device is extremely simple in operation and can be constructed at a nominal expense. By the selection of the proper size and material for the spring, the valve can be made to open at any desired pressure.

Changes in the specific form of the invention, as herein described, may be made within the scope of what is claimed without departing from the spirit of the invention.

Having described the invention, what is claimed as new and desired to be protected by Letters Patent is:

1. A relief valve for a pressure vessel, comprising in combination, a tubular body having an internal tapered valve seat terminating at a central inlet opening adapted to communicate with the pressure vessel, a valve member guided by means including the tubular body to move toward and away from the inlet opening, the end of the valve member adjacent the valve seat having a head including an external tapered surface of more acute angle than said valve seat, said head having a socket open to the inlet opening defined radially at its edge proximate the valve seat by a sharp-cornered annular rim disposed on said external surface and adapted in the valve closed position to seat on the valve seat on an annular substantially line contact, and a resilient sealing member snugly received in the socket and having a sharp-cornered edge portion projecting past the rim a limited distance at a sharp angle relative to the valve seat adapted to seat on the valve seat upon initial closure of the valve and be compressed by and between the valve seat and valve head, and the rim thereafter seating on the valve seat on said line contact radially outward of and immediately adjacent the seating of the sealing member on the valve seat.

2. A relief valve for a pressure vessel, comprising in combination, a tubular body having an internal frusto-conical valve seat terminating at a central inlet opening adapted to communicate with the pressure vessel, a valve member guided by means including the tubular body to move toward and away from the inlet opening along the longitudinal axis of the valve seat, the end of the valve member adjacent the valve seat having a head including an external frusto-conical surface of more acute angle than said valve seat and being symmetrical of the longitudinal axis thereof, said head having a socket open to the inlet opening defined radially at its edge proximate the valve seat by a sharp-cornered circular rim disposed on said external surface on a plane normal to the longitudinal axis, said rim being adapted in the valve closed position to seat on the valve seat on an annular substantially line contact, and a resilient sealing member snugly received in the socket and having a sharp-cornered edge portion projecting past the rim a limited distance at a sharp angle relative to the valve seat adapted to seat on the valve seat upon initial closure of the valve, and the rim thereafter seating on the valve seat on said line contact radially outward of and immediately adjacent the seating of the sealing member on the valve seat.

3. A relief valve for a pressure vessel, comprising in combination, a tubular body having an internal frusto-conical valve seat converging in the direction toward a central inlet opening adapted to communicate with the pressure vessel, a valve member guided by means including the tubular body to move in an axial direction toward and away from the inlet opening along the longitudinal axis of the valve seat, the end of the valve member adjacent the valve seat having a head including an external frusto-conical surface of more acute angle than said valve seat and adapted to seat against the valve surface, said head including a socket open to the inlet opening defined in part by a cylindrical surface symmetrical of the longitudinal axis of the valve seat and intersecting the exterior surface to define a sharp-cornered circular rim radially outward of the inlet opening, said rim being seatable with the valve seat on an annular line contact in the valve closed position, and a resilient sealing member snugly received in the socket and having a sharp-cornered cylindrical edge portion symmetrical of the longitudinal axis and projecting past the rim a limited substantially uniform distance adapted to engage the valve seat before the rim upon closure of the valve, the edge portion being compressed by and between the valve seat and valve head to deflect in slight sliding engagement along the valve seat toward the inlet opening, the rim thereafter seating on the valve seat radially outward of and immediately adjacent the seating of the sealing member on the valve seat.

References Cited in the file of this patent

UNITED STATES PATENTS

| | | |
|---|---|---|
| 1,271,898 | Holt | July 9, 1918 |
| 2,107,200 | Kennon | Feb. 1, 1938 |
| 2,485,092 | Gannon | Oct. 18, 1949 |
| 2,874,718 | Kelly | Feb. 24, 1959 |
| 2,927,737 | Zeuch | Mar. 8, 1960 |
| 2,994,340 | Biello et al. | Aug. 1, 1961 |

FOREIGN PATENTS

| | | |
|---|---|---|
| 159,275 | Great Britain | 1954 |
| 790,720 | Great Britain | 1958 |